Dec. 9, 1924.                                                    1,518,928
M. A. HOLLERTZ
ADJUSTABLE FENDER FOR CULTIVATORS
Filed April 2, 1923          2 Sheets-Sheet 2
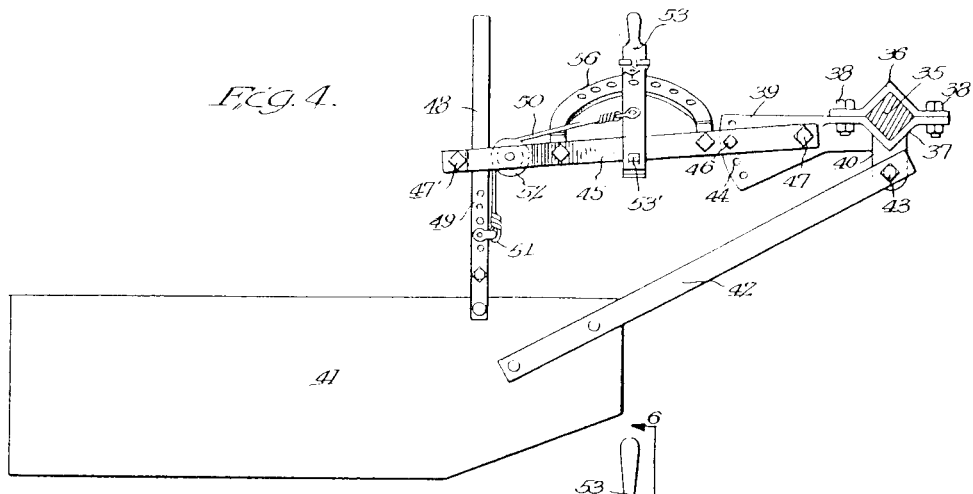
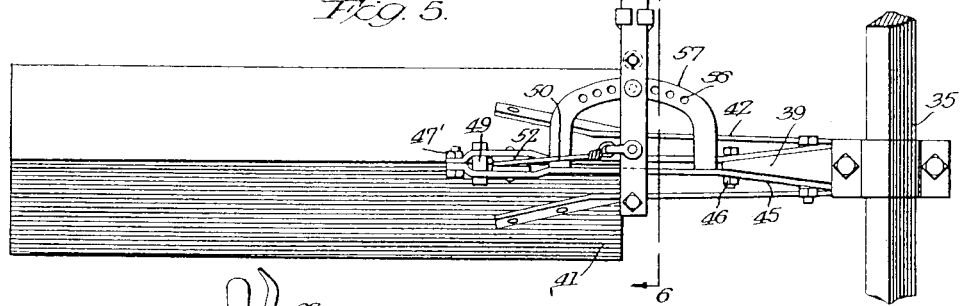
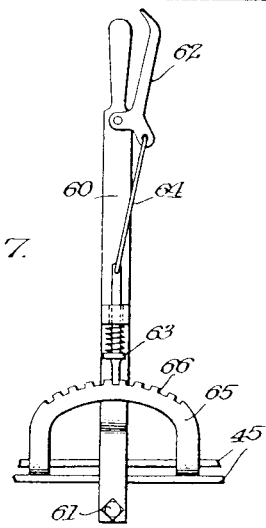
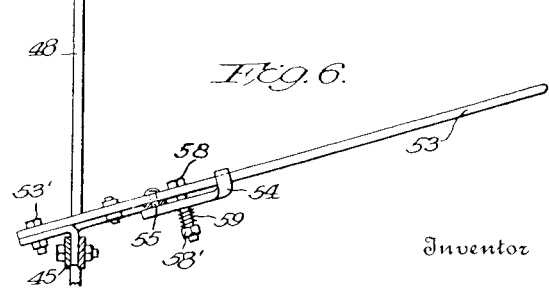

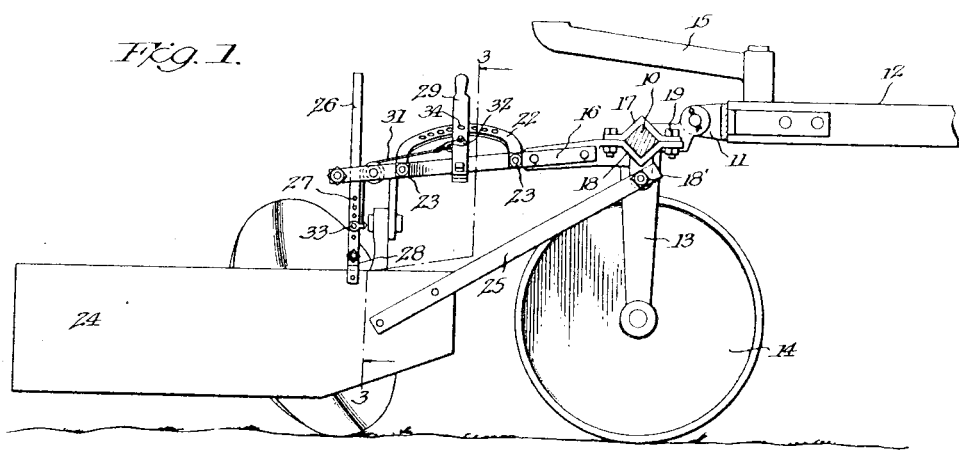
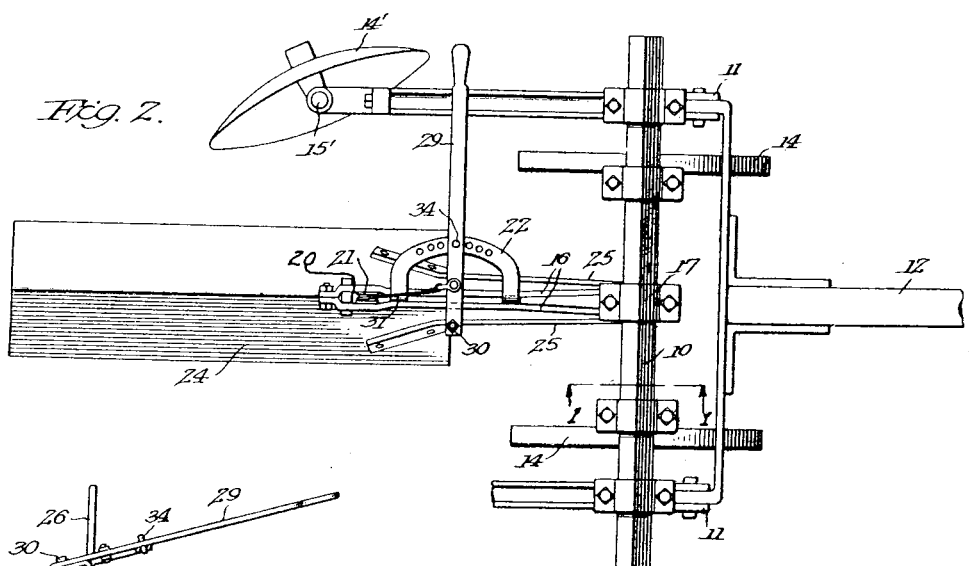
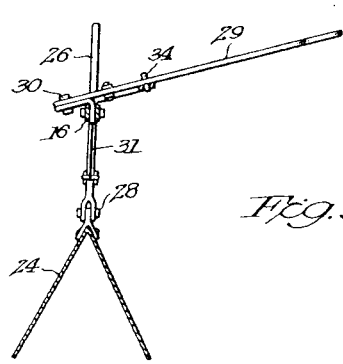

Patented Dec. 9, 1924.

1,518,928

UNITED STATES PATENT OFFICE.

MELCKER ALBIN HOLLERTZ, OF ATLANTA, NEBRASKA.

ADJUSTABLE FENDER FOR CULTIVATORS.

Application filed April 2, 1923. Serial No. 629,467.

*To all whom it may concern:*

Be it known that I, MELCKER A. HOLLERTZ, a citizen of the United States, residing at Atlanta, in the county of Phelps and State of Nebraska, have invented new and useful Improvements in Adjustable Fenders for Cultivators, of which the following is a specification.

This invention relates to cultivators, and more particularly to improvements in fender or shield attachments for lister cultivators.

Essentially, the invention consists in the provision of means whereby a fender or dirt shield may be expeditiously attached to a cultivator without interfering with the cultivating parts of the machine, and in such a manner as to be readily accessible by the driver in order that the fender may be easily raised or lowered while the cultivator is in motion.

Heretofore no means has been provided for independently regulating the fender while the cultivator is in operation. Obviously, therefore, when the machine is employed in cultivating plants or corn of different sizes and arranged in the same row, the fender being set to protect only the smaller plants, will pass over the larger plants without supplying them with sufficient dirt or mulch, and often leaves the weeds uncovered.

By reason of the present development, the objectionable features possessed by the ordinary cultivator are obviated, since the fender can be regulated by the driver to different positions while the machine is in motion, and without the necessity of changing the cultivating parts of the machine.

Referring to the drawings, wherein is set forth a preferred embodiment of my invention:

Figure 1 is a longitudinal sectional view taken substantially along the line 1—1 of Figure 2.

Figure 2 is a top plan view of Figure 1.

Figure 3 is a vertical sectional view taken substantially along the line 3—3 of Figure 1.

Figure 4 is a side elevation of a modified form of the invention.

Figure 5 is a top plan view of Figure 4.

Figure 6 is a vertical sectional view taken substantially along the line 6—6 of Figure 5.

Figure 7 is a detailed view of a modified form of operating lever.

Referring to the drawings wherein like numerals indicate like parts in the various views, 10 denotes the main cross frame preferably of a two row lister cultivator, to which is pivotally connected at 11 the draft beam 12. A drop axle 13 is attached to the frame 10, and is arranged so as to have the wheels 14 journalled in its depending ends. A supporting bar 15 is connected to the rear end of the draft beam 12, and is adapted to have secured thereto a driver's seat, not shown. A disk 14' is suitably connected to each of the side frames of the cultivator, as shown at 15'.

A pair of spaced arms 16, preferably made of iron, are secured at their forward ends to the frame 10 by the clamps 17 and 18 and the bolts 19. The arms 16 adjacent their opposite extremities are slightly enlarged so as to form an opening 20 in which is journalled the pulley 21, while a segmental perforated plate 22 is secured to the arms between the ends thereof by the bolts 23.

The fender or dirt shield 24 is pivotally connected by the brace rods 25 to the underside of the clamp 18 at 18'. A vertically disposed bar 26 having a plurality of openings 27 is secured at its lower end to the fender 24 preferably by a joint section 28, as shown in Figure 3.

The operating lever 29 is connected by the bolt 30 to the arms 16 and extends laterally therefrom towards the driver's seat so as to be readily accessible by the operator. A flexible member 31, such as a wire cable or the like is preferably connected to the lever 29 by the clevis 32, and to the bar 26 by the clevis 33. The arm 26 extends loosely through the opening 20 formed between the bars 16, and acts to steady the fender so as to maintain it firmly in position.

It will be seen that upon actuation of the lever 29, the fender 24 will be raised or lowered from the ground and can be maintained in any desired position by means of the bolt 34, which is adapted to fit in the perforations formed in the bar 22 and lock the lever 29 thereto. Additionally, the adjustment of the fender may be obtained by moving the flexible member 31 up or down in the holes 27 on the bar 26.

It is obvious that instead of the pair of arms 16 being employed, that these members may be made in the form of a single arm having the necessary recess therein for the reception of the pulley 21 and the bar 26.

By reason of the present construction, it will be apparent that the fender 24 can be regulated by the actuation of the lever 29 when the cultivator is in motion, and without the necessity of changing any of the parts of the machine. Furthermore, when the device is used in a field where the corn is of different sizes in the same row, the driver can accurately adjust the fender from his position on the seat, and allow as much mulch or loose dirt to be thrown in as the plant will stand without being covered.

Referring to Figure 4, wherein is disclosed a modified form of the invention, 35 designates the main cross frame of a cultivator and has secured thereto the clamps 36 and 37 by the bolts 38. The lower clamp 37 is provided with a rearwardly extending portion 39 and a depending lug 40. The fender 41 is pivotally connected to the lug 40 by the brace rods 42 and the bolt 43.

The portion 39 of the clamp 37 is wider at its rear end and is provided with a plurality of openings 44, to which are secured the arms 45 by the bolts 46 and 47. The arms 45 are slightly enlarged adjacent their rear ends, and are secured together by bolt 47'. A vertically disposed bar 48, which is secured at its lower extremity to the fender 41 extends through the enlarged portion formed between the bars 45 and has arranged therein a plurality of openings 49 to which are connected one end of a cable 50 by the clevis 51. The cable 50 passes over a pulley 52 journalled between the bars 45, and has its opposite end connected to the operating lever 53.

The lever 53 is pivotally connected to the bars 45 by the bolt 53' and is arranged to be held in any desired position by means of a metal strap 54, which is secured at one end to the lever, and is provided at its opposite end with an upwardly projecting lug 55, which is adapted to engage in the perforations 56 formed in the segmental plate 57. The lug 55 is resiliently maintained in engagement with the perforations 56 by means of the threaded bolt 58, which extends through the lever 53 and the strap 54, and has the nut 58' engaging with its lower end. A coil spring 59 interposed between the strap 54 and the nut 58' normally holds the lug 55 in position.

It will be seen that by reason of this construction, the bars 45 may be adjusted relative to the cultivator to any desired height, according to the particular type of machine with which the device is applied.

In the modified form of operating lever disclosed in Figure 7, an arm 60 is pivoted at 61 to the bars 45 and is provided with a movable hand lever 62, which is connected to a spring actuated pawl 63 by the rod 64. A segmental rack 65 is suitably connected between the bars 45 and has a plurality of notches 66 formed in its outer periphery, adapted to receive the pawl 63 and hold the lever 60 in any desired position.

It is to be understood that such changes that involve merely the exercise of mechanical skill may be made without departing from the scope of my invention and the appended claims.

I claim:

1. The combination with the main cross frame, of a cultivator, of a fender pivotally connected to said frame, a pair of arms extending rearwardly from said cultivator, a bar secured to said fender and loosely passing between said arms, a laterally projecting lever secured to said arms, means connected to the lower extremity of said bar and said lever for raising said fender, and means for locking said lever in different adjusted positions.

2. The combination with the main cross frame, of a cultivator, of a fender, means pivotally connecting said fender to the cultivator comprising an arm adapted to be detachably secured to said cross frame, brace rods attached to said fender and said arm, a pulley in said arm, a substantially vertical bar secured to said fender and extending loosely through an opening in said arm, a lever in said arm and flexible means passing over said pulley and connected to the lower extremity of said bar and said lever for raising said fender when the lever is actuated.

3. A fender attachment for cultivators comprising a pair of connected arms, means at one end of said arms for pivotally securing the fender to a cultivator, a substantially vertical bar attached at its lower extremity to said fender and extending loosely between said arms, a lever mounted on said arms, and flexible means connected to said bar and lever for raising said fender.

4. A fender attachment for cultivators comprising a pair of connected arms, means at one end of said arms for pivotally securing the fender to a cultivator, a substantially vertical bar attached at its lower extremity to said fender and extending loosely between said arms, a lever mounted on said arms, flexible means connected to said bar and lever for raising said fender, and means for locking said lever in different adjusted positions.

In testimony whereof I have hereunto set my hand.

MELCKER ALBIN HOLLERTZ.